United States Patent [19]

Abe et al.

[11] Patent Number: 4,719,095

[45] Date of Patent: Jan. 12, 1988

[54] PRODUCTION OF SILICON CERAMIC POWDERS

[75] Inventors: Susumu Abe, Toyota; Masahiro Ogawa, Toyoake, both of Japan

[73] Assignee: Toyota Jidosha Kabushiki Kaisha, Toyota, Japan

[21] Appl. No.: 825,571

[22] Filed: Feb. 3, 1986

[30] Foreign Application Priority Data

Feb. 2, 1985 [JP] Japan .................................. 60-18999
Feb. 2, 1985 [JP] Japan .................................. 60-19000

[51] Int. Cl.$^4$ ............................................. C01B 31/36
[52] U.S. Cl. ........................................ 423/346; 501/88
[58] Field of Search ........................... 501/88; 423/346

[56] References Cited

U.S. PATENT DOCUMENTS 3,306,705  2/1967  Leineweber et al. .................. 501/88
4,460,697  7/1984  Hara et al. ............................ 501/87

FOREIGN PATENT DOCUMENTS 0064277  4/1983  Japan ..................... 501/88
0064278  4/1983  Japan ..................... 501/88
0088168  5/1983  Japan ..................... 501/88

*Primary Examiner*—William R. Dixon, Jr.
*Assistant Examiner*—James M. Hunter, Jr.
*Attorney, Agent, or Firm*—Oblon, Fisher, Spivak, McClelland & Maier

[57] ABSTRACT

A process for producing silicon ceramic powder, which comprises, oxidizing metallic silicon powder in an oxidizing gas atmosphere into silicon monoxide in the form of ultrafine particles or gas, and reducing said silicon monoxide in a reducing gas atmosphere containing at least nitrogen or carbon, thereby producing silicon nitride, silicon carbide or mixtures thereof.

10 Claims, 1 Drawing Figure

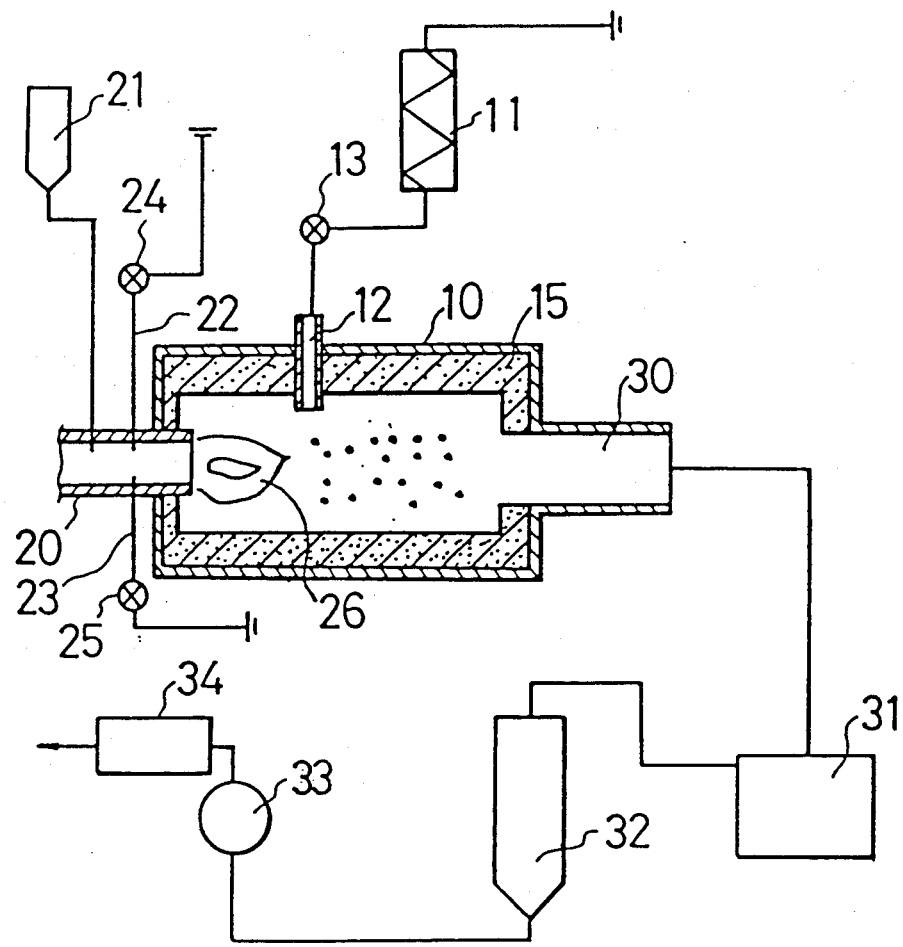
FIGURE

PRODUCTION OF SILICON CERAMIC POWDERS

BACKGROUND OF THE INVENTION

1. Field of the Invention

The present invention relates to a process for producing silicon nitride or silicon carbide or both (collectively referred to as silicon ceramics hereinafter) in the form of a fine powder.

2. Discussion of the Background

Silicon ceramics are used in various fields of application because of their low coefficient of thermal expansion, high strength at high temperatures, and superior heat shock resistance. When it is desired to prepare silicon ceramics which exhibit increased catalytic activity, or when it is desired to effectively sinter silicon ceramics at low temperatures, the silicon ceramic should be powdered to a particle diameter less than 1000 Å.

Conventionally, silicon nitride powder is produced by reacting metallic silicon directly with nitrogen as described in reaction scheme (1) as follows:

$$3Si + 2N_2 \rightarrow Si_3N_4 \quad (1)$$

Silicon nitride is also produced by reacting silicon tetrachloride with ammonia, as shown in reaction scheme (2) as follows:

$$3SiCl_4 + 3NH_3 \rightarrow Si_3N_4 + 12HCl \quad (2)$$

Still further, silicon carbide powder can be produced by reacting silicon dioxide with carbon, as shown in reaction scheme (3) as follows:

$$SiO_2 + 3C \rightarrow SiC + 2CO \quad (3)$$

Silicon carbide can also be produced by reacting silicon tetrachloride with methane as shown in reaction scheme (4) as follows:

$$SiCl_4 + CH_4 \rightarrow SiC + 4HCl \quad (4)$$

However, all of the above-described processes have problems. The reaction of scheme (1) above requires metallic silicon of high purity in finely powdered form, and produces a silicon nitride powder product which is constituted of a broad particle size distribution. This particular reaction does not yield a product powder finer than 1000 Å except with great difficulty. In addition, the scheme inevitably results in the incorporation of impurities in the ceramic product, because of the limited availability of pure metallic silicon in finely powdered form. The third reaction scheme requires high temperatures in excess of 2000° C., which means that large amounts of heat energy are required. The process also yields a coarse silicon carbide powder product which must subsequently be pulverized. The resulting powder has a broad particle size distribution and has very few particles of a diameter smaller than 1000 Å. Further, the pulverization step which is required results in impurity incorporation in the ceramic product and results in increased production costs. Finally, the second and fourth processes require expensive silicon tetrachloride as a starting material and give off harmful hydrogen chloride gas that has to be properly disposed of. All of these factors increase the price of silicon ceramics. A need therefore continues to exist for a method of simply and economically producing finely powdered silicon ceramics.

SUMMARY OF THE INVENTION

Accordingly, one object of the present invention is to provide a process for producing finely powdered silicon ceramics in an easy manner.

Another object of the present invention is to provide a process for producing silicon ceramic powder of a uniform particle size.

Still another object of the present invention is to provide a process for producing inexpensive silicon ceramic powders.

Briefly, these objects and other objects of the present invention as hereinafter will become more readily apparent can be attained by a process of producing silicon ceramic powder by oxidizing metallic silicon powder in an oxidizing gas atmosphere into silicon monoxide in the form of ultrafine particles or gas, and reducing said silicon monoxide in a reducing gas atmosphere containing at least nitrogen or carbon.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a flowsheet of the reaction of Examples 1 and 2 of the present invention.

DETAILED DESCRIPTION OF THE PREFERRED EMBODIMENTS

The oxidation step in the process of the present invention is an important feature of the present invention. In this step metallic silicon powder is oxidized in an oxidizing gas atmosphere into silicon monoxide. The powdered metallic silicon starting material should preferably be of a particle size finer than 200 mesh. Metallic silicon of this particle size yields silicon ceramic powder having the desired particle size range of 100 Å to 1000 Å. The process of the invention does not require a metallic silicon powder of high purity.

Suitable examples of the oxidizing gas include oxygen and ozone, which oxidize metallic silicon powder into silicon monoxide. The reaction of metallic silicon powder with an oxidizing gas may be performed by different techniques. In a preferred technique, a dust cloud is formed from metallic silicon and an oxidizing gas, and this cloud is subsequently ignited, thereby resulting in explosive combustion of the silicon. This combustion generates a large amount of heat which produces a high temperature and which promotes the extensive oxidation of metallic silicon powder, thereby forming silicon monoxide as an ultrafine powder or gas. In addition, the heat energy generated in the oxidation reaction may be used to supply heat for the reduction step which follows.

A burner, plasma jet, arc discharge, or laser beam can be employed to ignite the dust cloud. The density of the dust cloud may be adjusted according to the particle size of metallic silicon powder employed and the ignition means used. Furthermore, powdered metallic silicon may be fed intermittently at short intervals or continuously to the reactor. Moreover, the reaction flame should be formed continuously for good heat efficiency.

The reduction step which follows the oxidation step effects the reduction of silicon monoxide obtained from the oxidation step into silicon ceramic powder. The reducing gas which is used in the reduction step is a gas which contains a reducing element and at least nitrogen or carbon. The reducing element may be a single substance or a combination of substances.

In an embodiment of the invention, silicon nitride is prepared by a process in which carbon monoxide, hydrogen or a hydrocarbon gas is used as the reducing gas. Nitrogen containing gases include ammonia and amines. Mixtures of these gases may also be used as a reducing gas. A reducing gas may also be formed from a hydrocarbon compound which contains nitrogen in the molecule. In this case, a single gas provides for reduction and nitridation of the oxidized silicon simultaneously. If such a hydrocarbon compound is used in combination with excess carbon, i.e., an amount of carbon in excess of the equivalent amount needed for reduction, the process will provide a mixture of silicon nitride and silicon carbide. The composition of such a mixture may be controlled as desired depending on the ratio of nitrogen to carbon employed in the reducing gas.

In another embodiment of the invention, silicon carbide is prepared by a process in which the reducing gas employed is a dust cloud formed by dispersing carbon particles in hydrogen gas. This dust cloud reduces silicon monoxide and achieves carbonization simultaneously. It is also possible to use a hydrocarbon gas such as methane or ethane which contains sufficient hydrogen to reduce silicon monoxide and sufficient carbon to perform carbonization. When a hydrocarbon gas is employed, reduction by the action of hydrogen and carbon takes place first, followed by carbonization.

The preheating of the reducing gas employed is desirable in order to prevent the reaction system from being cooled by the gas.

Upon contact with the reducing gas at a high temperature, silicon monixide is reduced and then the reduced silicon undergoes at least nitridation or carbonization. It is desirable to perform the oxidation step and the reduction step consecutively so that the heat in the oxidation step is effectively used. In the case where oxidation is performed by the combustion of a dust cloud of metallic silicon powder and an oxidizing gas, a continuous reaction flame is formed which containes a large amount of silicon monoxide. If proper arrangements are made to provide for the formation of a continuous reaction flame in the reducing atmosphere, it is possible to perform reduction and at least nitridation or carbonization continuously by utilizing the heat energy of the reaction flame. In this case, silicon monoxide in the form of ultrafine powder or gas, is made into a finely powdered silicon ceramic. The silicon ceramic thus obtained can be collected by a proper collector such as a bag filter. The waste gas from the collector should be properly treated before discharge, because it contains unreacted oxidizing gas and reducing gas containing nitrogen or carbon.

An aspect of the present invention is that the heat generated by the reaction of metallic silicon powder with an oxidizing gas, which is initiated by means of an ignitor such as a burner or plasma jet, promotes the reaction of the remaining metallic silicon powder. This leads to a very highly heat efficient process and low production costs. The reaction of metallic silicon powder with an oxidizing gas, continuously forms a reaction flame containing silicon monoxide in the form of ultrafine powder or gas. Upon contact with a reducing gas containing at least nitrogen or carbon, the reaction flame continuously forms a large amount of finely powdered silicon ceramic. Thus, the process of the present invention provides a uniform silicon ceramic powder very efficiently.

Having generally described this invention, a further understanding can be obtained by reference to certain specific examples which are provided herein for purposes of illustration only and are not intended to be limiting unless otherwise specified.

EXAMPLE 1

The apparatus employed in this example is shown in FIGURE. It is constructed mainly of a reaction furnace (10) and a burner (20). The reaction furnace is surrounded by an inner wall (15) of fire bricks and is provided with an outlet (30) which passes through one wall. The burner (20) is mounted on the furnace wall facing the outlet. For the burner to produce a flame in the reaction furnace, it is provided with a feeder (21) for metallic silicon powder, an oxygen supply tube (22), and an LPG supply tube (23). (LPG is the fuel for the pilot flame). The upper wall of the reaction furnace (10) is provided with an inlet for a mixed gas of methane and ammonia. The mixed gas is fed through preheater (11).

Beyond the outlet (30) are serially arranged a powder collector (31) and a bag filter (32) to collect fine powder particles which have passed through the powder collector. The waste gas from the bag filter is discharged through a combustion treating unit (34) by blower (33).

The apparatus described above was used to prepare silicon nitride powder as follows:

At first, valve (24) of oxygen supply tube (22) and valve (25) of LPG supply tube (23) were opened, and the burner (20) was ignited to dry the reaction furnace (10) completely and to remove oxygen from the reaction furnace (10). Metallic silicon powder was fed continuously at a rate of 10 to 30 kg/hour through the powder feeder (21). Simultaneously, oxygen was fed into the furnace at a rate of 4 to 12 $Nm^3$/hour (equivalent to the amount of metallic silicon powder being fed) through the oxygen supply tube (22). Then, valve (13) of the reducing-nitriding gas supply tube (12) was opened to introduce a gaseous mixture of methane and ammonia heated to about 1000° C. by preheater (11). The flow rate of the gaseous mixture was controlled in order to feed methane gas a rate of 8 to 24 $Nm^3$/hour and ammonia gas at a rate of 11 to 32 $Mn^3$/hour.

As these raw materials were continuously fed to the reaction furnace, a reaction flame (26) was continuously formed at the opening of the burner (20) as the result of oxidation of metallic silicon powder. Upon heating by the reaction flame, carbon and hydrogen in methane and hydrogen in ammonia reduced the silicon ceramic and nitrogen in ammonia resulted in nitridation to form silicon nitride powder. The silicon nitride powder was collected by collector (31) and bag filter (32) at a yield of 16 to 40 kg/hour. The waste gas which had passed through the bag filter (32) was introduced into the combustion treating unit (34) by a blower (33), and finally discharged to the atmosphere.

Electron microscope and X-ray diffraction analysis showed and resulting powder to be silicon nitride powder which had an amorphous structure having a particle diameter of 100 Å to 1000 Å.

EXAMPLE 2

Using the same apparatus as described in Example 1, silicon carbide powder was produced by the supply of methane gas alone to the reducing part of the furnace by the following procedure:

At first, valve (24) of the oxygen supply tube (22) and valve (25) of the LPG supply tube (23) were opened, and the burner (20) was ignited to dry the reaction furnace (10) completely and to remove oxygen from the reaction furnace (10). Metallic silicon powder was fed continuously at a rate of 10 to 30 kg/hour through the powder feeder (21) into the furnace. Simultaneously, oxygen was fed into the furnace at a rate of 4 to 12 Nm$^3$/hour, which is equivalent to the amount of metallic silicon powder being fed into the furnace, through the oxygen supply tube (22). Then, valve (13) of the methane gas supply tube (12) was opened to introduce methane heated to about 1000° C. by the preheater (11) into the furnace. The flow rate of methane was 16 to 24 Nm$^3$/hour.

At these raw materials were continuously fed to the reaction furnace, a reaction flame (26) was continuously formed at the opening of the burner (20) as the result of oxidation of metallic silicon powder. Upon heating by the reaction flame, the methane gas functioned both as reducing agent and carbonizing agent to yield silicon carbide powder. The silicon carbide powder was collected by collector (31) and bag filter (32) in a yield of 14 to 40 kg/hour. The waste gas which had passed through the bag filter (32) was introduced into the combustion treating unit (34) by a blower (33), and finally discharged to the atmosphere.

Electron microscope and X-ray diffraction analysis showed the resulting powder to be silicon carbide powder which has a β-type cubic system having a particle diameter of 100 Å to 1000 Å.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A process for producing silicon ceramic powder, which comprises:
    (a) oxidizing metallic silicon powder in an oxidizing gas atmosphere into silicon monoxide in the form of ultrafine particles or gas; and
    (b) reducing said silicon monoxide in a reducing gas atmosphere containing at least nitrogen or carbon, thereby producing silicon nitride, silicon carbide or mixtures thereof.

2. The process of claim 1, wherein
    said reduction is continously conducted as the oxidation continuously proceeds, and the heat from the oxidation step provides the energy for the reduction process.

3. The process of claim 1, wherein
    said oxidation step is conducted by forming a dust cloud from metallic silicon powder and an oxidizing gas, and then igniting the dust cloud to cause explosive burning of the silicon powder.

4. The process of claim 1, wherein said reducing gas is a mixture of a hydrocarbon gas and ammonia.

5. The process of claim 1, wherein said reducing gas is a hydrocarbon gas.

6. The process of claim 1, wherein the ignition is accomplished by means of a burner or a plasma jet.

7. The process of claim 1, wherein the metallic silicon powder has a particle diameter smaller than 200 mesh.

8. The process of claim 1, wherein the nitrogen-containing reducing gas is preheated prior to reducing said silicon monoxide.

9. The process of claim 1, wherein said silicon ceramic powder product has a particle size of 100 Å to 1000 Å.

10. A process for producing silicon ceramic powder, which comprises:
    (a) forming a dust cloud of metallic silicon and an oxidizing gas;
    (b) explosively oxidizing said silicon dust thereby forming silicon monoxide in the form of ultrafine particles or a gas; and
    (c) reducing said silicon monoxide in a reducing gas atmosphere containing at least nitrogen or carbon, thereby producing silicon nitride, silicon carbide or mixtures thereof in a particle size range of 100 Å to 1000 Å.

* * * * *